Oct. 24, 1933.  J. WAHL  1,931,637
EQUALIZING VALVE
Filed Oct. 29, 1930
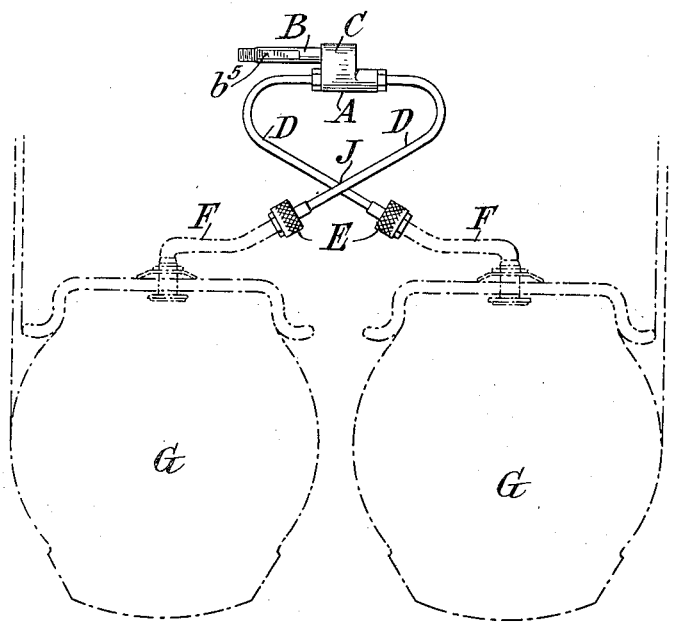
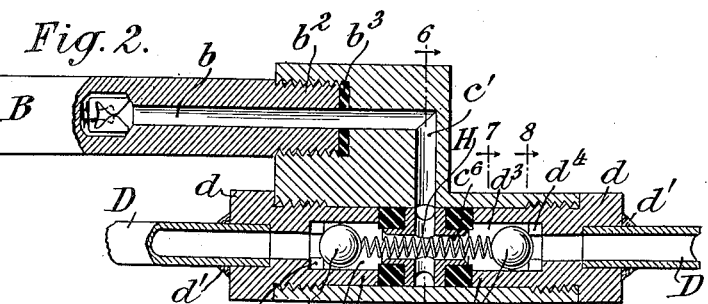
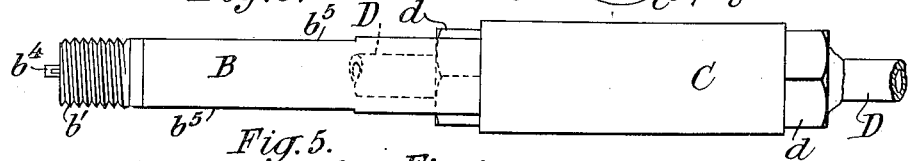
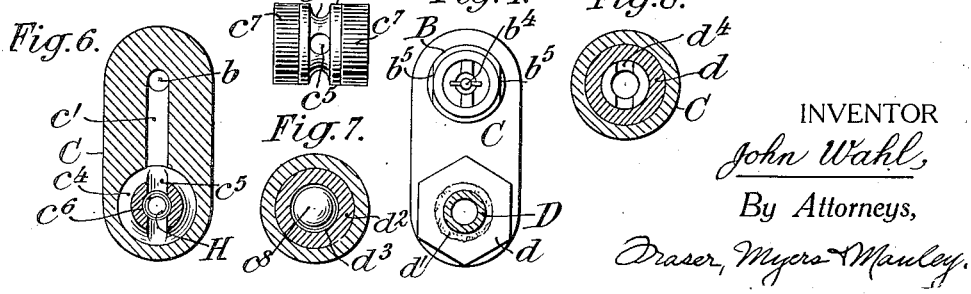
INVENTOR
John Wahl,
By Attorneys,
Fraser, Myers & Manley.

Patented Oct. 24, 1933

1,931,637

UNITED STATES PATENT OFFICE 1,931,637

EQUALIZING VALVE

John Wahl, Rosedale, N. Y., assignor to A. Schrader's Son, Incorporated, Brooklyn, N. Y., a corporation of New York Application October 29, 1930. Serial No. 491,877

1 Claim. (Cl. 152—12)

The present invention relates to equalizing valves for dual or multiple tires mounted upon wheel rims, and aims to provide certain improvements therein.

In the conventional use of dual and multiple tires mounted side by side on vehicle wheels, each tire must be separately inflated and gauged. The inner tires are usually mounted over the brake drums which give off much heat and consequently the tubes and the valves of said tires are subjected to radiant and conductive heat from said brake drums, with the result that the tire valves do not stand up well, the valve stems become very hot, rendering inflating and gauging troublesome and the pressure within the tubes is increased much beyond its intended degree, thereby imposing strain thereon which tends to lessen the life of the tires.

According to the present invention the aforementioned disadvantages are overcome by the use of an equalizing valve adapted to be positioned at a point remote from the source of heat and through which valve multiple tires may be simultaneously inflated, the pressure within the tires always equalized, and in an emergency such as the occurrence of a blow-out of one of the tires, the fluid pressure within the other tire or tires is automatically checked against escape. The invention also embodies other features of novelty, which will be hereinafter more fully described.

In the accompanying drawing, wherein I have shown a preferred embodiment of my invention, Figure 1 is a side elevation of an equalizing valve embodying the present invention disclosed in its manner of connection with a pair of dual tires.

Fig. 2 is a longitudinal section through the equalizing valve shown in Fig. 1, a part of the casing being shown in elevation.

Figs. 3 and 4 are a top plan view and end view, respectively, of the equalizing valve shown in Figs. 1 and 2.

Fig. 5 is an elevation of a detail of the invention.

Figs. 6, 7 and 8 are sections taken along the planes of the lines 6—6, 7—7 and 8—8, respectively, of Fig. 2.

Referring to the drawing, let A indicate the equalizing valve as a whole, which comprises an inflating stem B, a casing C, and connecting conduits D, the free ends of which are provided with swivelled coupling nuts E adapted for connection with the valve stems F of a pair of dual tires G.

The inflating stem B has a passage $b$ extending therethrough, and at one end, $b'$, is externally screw-threaded to provide a nipple for connection with a conventional inflating chuck, and at its other end, $b^2$, is screw-threadedly connected within an opening in the casing C, a packing $b^3$ being provided at the end of said connection to insure a leaktight joint. Within the outer end of the casing B there is fitted a conventional valve inside, the top of which, $b^4$, is shown as extending beyond the nipple end $b'$, and the bottom of which is shown in elevation in Fig. 2. For facilitating the screw-threaded connection between the inflating stem and the casing, the sides of the former are flattened, as indicated at $b^5$, to provide wrench-engaging surfaces.

The casing C may be of any desired configuration, and is provided with a plurality of ducts or passages for connection, respectively, with the inflating stem and the connecting conduits. In the present case a duct $c'$ communicates with the duct $b$ in the stem B and with the interior of the equalizing valve proper. Within the casing C, and preferably located centrally thereof, is a member $c^3$ which serves to normally establish communication between the duct $c'$ and the interior of the vulcanizing valve. The member $c^3$ is of cylindrical form and provided centrally of its ends with an annular groove $c^4$, radial ducts $c^5$ and an axial duct $c^6$ and has mounted on its opposite ends disks of packing material $c^7$ which serves as secondary valve seats for ball valves $c^8$ mounted within the casing.

The member $c^3$ is held in position within the casing C so that the annular groove $c^4$ lies opposite to the duct $c'$ by the coupling member $d$ which are carried at the ends of the connecting conduits D and preferably rigidly attached thereto, as through the medium of soldering indicated by the reference character $d'$. The coupling members $d$ are screw-threadedly engaged within the opposite ends of the casing C and are provided at their inner ends with reduced extensions $d^2$, the ends of which engage the packings $c^7$ and serve the dual purpose of holding the member $c^3$ in position and providing a leaktight seal between the casing C and the connecting conduits D. The ends $d^2$ of the coupling members are internally enlarged, as indicated at $d^3$ and provide shoulders which serve as primary seats for the ball valves $c^8$. It is not intended that the primary seating of the valves should provide a leaktight seal between the enlarged chambers $d^3$ and the connecting conduits D; hence, said seating surfaces are provided with cut-away portions $d^4$ which serve as a by-pass for fluid from the connecting conduits to the enlarged chambers $d^3$. The valves $c^5$ are intended normally to seat against the primary valve seats, and to accomplish this a coil spring H is provided, which spring preferably is disposed within the axial duct $c^6$ within the member $c^3$, and is merely of sufficient force to hold the ball valves against their primary seats.

The connecting conduits D are preferably formed of pliable, settable material, such as copper tubing or the like, and are of a length to permit the equalizing valve being disposed at any desired point. In Fig. 1 the conduits D are shown as crossed at J, but it will be understood that said conduits may be given any desired form and arrangement to suit any particular type of wheel mounting.

In use of equalizing valve A may be connected to the valve stems of a plurality of tires, as shown in Fig. 1, it being remembered that the valve insides are first removed from the tire valve stems F. To inflate the tires, the inflating chuck is applied to the nipple $b'$ to unseat the check valve therein, whereupon air under pressure will pass through ducts $b$, $c'$, annular groove $c^4$, grooves $c^5$ and $c^6$, enlarged chambers $d^3$, by-passes $d^4$ and conduits D into the tires G. The valves $c^5$ being held to their primary seats by the spring H, it will be appreciated that the pressure within the tires G after inflation will become equalized, since there is free communication therebetween through the member $c^3$. Also, as the pressure in one of the tires increases, due to heat liberated by the brake band, or decreases due to a slow leak, said changes in pressure will be equally distributed between the tires. This equalization will take place under all conditions of varying temperature and pressure where the variations in pressure are relatively gradual. However, should one of the tires blow out, or if for any other reason the pressure therein is suddenly substantially reduced, the sudden preponderance of pressure in the other tire acting upon the ball valve in the enlarged chamber leading thereto will move said valve against the force of the spring H upon its secondary valve seat $c^7$ to seal the passage $c^6$ therethrough. It will thus be appreciated that under normal operating conditions the pressure within both tires will be held the same, but under abnormal conditions the desired fluid pressure will be retained in at least one of the tires.

From the foregoing detailed description and explanation it will be understood that the invention is susceptible to embodiments in different forms from that herein specifically disclosed without departing from the spirit of the invention.

What I claim is:

A device of the character described, comprising a body portion having a longitudinal bore and a transverse bore joining the longitudinal bore at its center portion, a plug in the center portion of the bore having a longitudinal passage therethrough terminating in valve seats and a passage connecting the passage between the valve seats with the transverse bore in the body portion, valves for seating on said seats, perforated end plugs in the ends of the longitudinal bore of the body portion having extensions on their inner ends to bear against and maintain the center plug in position, the perforations in said end plugs adapted to communicate with tubes leading to two pneumatic tires, and the transverse bore in the body portion having a check valve therein and adapted to be connected to a source of compressed air for inflating two tires.

JOHN WAHL.